UNITED STATES PATENT OFFICE.

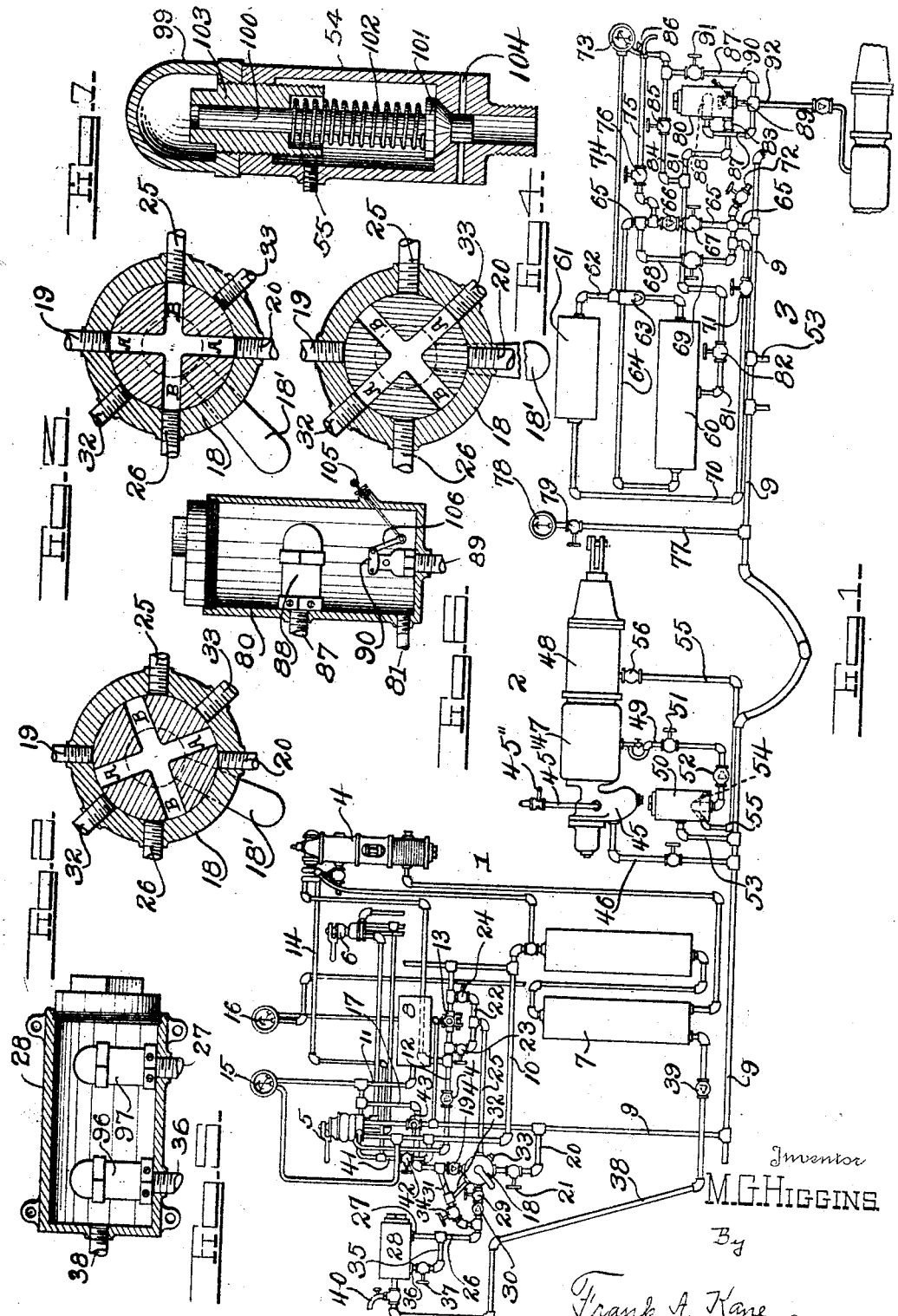

MARTIN G. HIGGINS, OF DUNMORE, PENNSYLVANIA.

PRESSURE BRAKE SYSTEM.

1,310,951.  Specification of Letters Patent. Patented July 22, 1919.

Application filed May 18, 1916. Serial No. 98,309.

*To all whom it may concern:*

Be it known that I, MARTIN G. HIGGINS, a citizen of the United States, residing at Dunmore, in the county of Lackawanna and State of Pennsylvania, have invented certain new and useful Improvements in Pressure Brake Systems, of which the following is a specification, reference being had therein to the accompanying drawings.

This invention is directed to improvements in pressure brake systems, and contemplates an arrangement whereby the pressure medium is more evenly distributed; whereby points distant from the source of supply are maintained at a pressure of predetermined, uniform degree; and whereby loss of pressure medium is more quickly compensated than with devices heretofore in use.

It contemplates, among other objects, the provision of means for storing, distributing and regulating pressure in a train line or the like, in such a manner that application and release of the brakes may be effected simultaneously, regardless of the length of the train; it provides means for quickly building up pressure at distributing points along the train line and likewise for quickly and uniformly lowering the same.

A further object is economy in the use of pressure medium, and its consequent reduction in the amount of work required by the pressure medium supply apparatus. By the instrumentalities constituting this invention, much of the pressure medium heretofore wasted to the atmosphere, and excess pressure medium which passed into auxiliary reservoirs due to leaky valves, etc., is stored in an equalizing and distributing device, and means are provided for distributing the pressure medium so stored, automatically, or under control of an operator, to various points in the train line.

Piling, due to quick application at the head end of a train, is eliminated by the present invention, and a system devised wherein the pressure medium is under more positive control and will respond more quickly under severe conditions of usage. Other objects and advantages will be in part apparent, and in part explained in the description which follows.

A drawing, illustrating an embodiment of the invention, is hereto appended, the following views being shown:

Figure 1, is a diagrammatic view of a pressure brake system equipped with my invention;

Figs. 2, 3, and 4, are transverse sectional views of a controlling mechanism in three different positions;

Figs. 5, and 6, are views in sectional elevation showing forms of equalizing, storing and distributing devices;

Fig. 7, is a sectional detail view of a pressure regulating and relief valve.

The instrumentalities shown in Fig. 1, comprise essentially a central or primary control station, also called an engine equipment 1, a car equipment 2, and a secondary control or caboose equipment 3.

The engine equipment comprises a source of pressure supply or pump 4, a primary control member or brake valve 5, independent brake valve 6, main reservoir 7, and equalizing reservoir 8. Associated with, and connecting these members are a train pipe 9, main reservoir pipe 10, equalizing reservoir pipe 11, feed valve pipe 12, feed valve 13, excess pressure operating pipe 14, and duplex gages 15 and 16.

By my invention there is tapped into the equalizing reservoir pipe 11, a pipe 17, the connection being made between the equalizing reservoir and the brake valve. The other end of this pipe is connected with an opening in a 4 or 6 way control valve 18, and has a check valve 19 placed between the valve and the equalizing reservoir to prevent pressure from the latter from backing into the valve. On the opposite side of the valve 18, a pipe 20 connects the valve with the train line, and this pipe is supplied with a cut out cock 21.

A by-pass 22, having oppositely disposed cut out cocks 23 and 24, is carried around the feed valve 13, being connected on opposite sides thereof to the feed valve pipe 12 and communicating, as through pipe 25 with the control valve 18.

A pipe 26, which is in the nature of a continuation of pipe 25, extends from the opposite side of the control valve 18, and is connected, as at 27, with a combined storing, regulating and distributing instrumentality 28, which will be described in detail later. In proximity to its connection with the valve 18, this pipe is provided with a cut out cock 29, and a check valve 30, the latter being arranged to prevent back pressure from the direction of the receptacle 28.

Connecting pipes 17 and 26, there is a branch pipe 31, which is in turn connected, as by pipe 32, with the control valve 18. On the opposite side of valve 18, and in alinement with this connection, there is provided an exhaust port 33. In proximity to its point of connection with pipe 26, pipe 31 is provided with a cut out cock 34.

A branch pipe 35, leading off from pipe 26, is connected, as at point 36, to box 28, and this pipe has also a cut out cock 37 between these two points. Leading out from the end of box 28, there is a pipe 38, which at its opposite end, connects with the main reservoir. This pipe has a check valve 39 set to prevent back pressure from the main reservoir entering the case box 28, and is also provided with a vent cock 40 in proximity to the case box.

The remaining portions of the train equipment consists of a pipe 41 connecting main reservoir pipe 10 and excess pressure operating pipe 14; a stop cock 42 arranged on this pipe 40; a cut out cock 43 on train pipe 9; and a check valve 44 to prevent back pressure from entering the feed valve.

As it might involve ambiguity to describe the working of the devices in conjunction with the location and description of the parts, these will be first treated, and their operation and coöperation brought out later.

The car equipment comprises the usual triple valve 45, connected to the train line by pipe 46, and communicating with auxiliary reservoir 47 and brake cylinder 48. In conjunction therewith the present invention comprises a branch pipe 49, connected with the auxiliary reservoir at one end and at the other to a combined equalizing, storing and distributing instrumentality 50, the detailed construction of which will be later disclosed. Intermediate its ends, pipe 49 is provided with a cut out cock 51, and a check valve 52, the latter being set to prevent return of pressure from the box 50 to the auxiliary reservoir.

Box 50 has a pipe 53 connecting its interior with the train line, and on its interior, in communication with pipe 49 there is a combined safety and relief valve 54. Through an opening in the side of the box, there is connected a pipe 55 which extends from the top of the relief valve and connects with the brake cylinder about midway the length of its stroke. This pipe has, between these connection points, a restricted bushing 56, and is intended to equalize pressure and prevent the popping of the relief valve when the brake cylinder piston is set in motion by an emergency application when there is an excessive pressure in the auxiliary reservoir. This contingency sometimes arises when auxiliaries are being charged above the standard train-line pressure, and during this charging it becomes necessary to make an emergency application.

With special reference to Fig. 7, it will be seen that pressure from the auxiliary reservoir is utilized to raise the valve 101 against the tension of spring 102. This spring being set at predetermined tension, the pressure in this auxiliary reservoir is thus regulated. Against this pressure there is acting the brake cylinder pressure carried through pipe 55 and into the casing wherein the spring is located, and this will tend to offset the pressure from the auxiliary reservoir and thus permit the spring to force the valve 101 into closed position. It sometimes happens that the engineer may be utilizing the train line to charge the tanks in the caboose equipment, and it is in such an exigency as this that the valve 101 is utilized to prevent the pressure from the auxiliary reservoirs backing up into the train line.

The secondary control or caboose equipment comprises a storage tank 60 of high capacity, another tank 61 of smaller capacity, and a connecting pipe 62 with a check valve 63 between the tanks. Under ordinary working conditions tank 61 is generally about one thousand cubic inches less in its interior dimensions than tank 60. The reservoir 61 is of smaller capacity than the reservoir 60, and in closer connection with the train line so that the action of the air from this reservoir will be more prompt and effective on the train line than that from the reservoir 60. High capacity tank 60, is connected, as by pipes 64 and 65 to train pipe 9, and in conjunction with pipe 65, there is provided a combined restricted bushing and check valve 66, a cut out cock 67, and a by-pass 68, which is also provided with a cut out 69. Low capacity tank 61, is, through pipe 70, and cut out 71, in communication with by-pass 68, and pipe 65 is also provided with a combined feed and vent pipe 72. Its use as a vent pipe will be apparent. It can be used as a feed pipe to fill the tanks by connecting it with a charging apparatus. When utilizing the vent pipe 72 for the purpose of charging the tanks, the usual train line angle cocks may be closed. If it is desired to charge the train line by this means, then the communication to the tanks may be cut off and the usual train line angle cocks left open.

For pressure testing, a duplex gage 73 is connected by pipe 74 to the high pressure tank side of check valve 63, and pipe 75 is connected with the high capacity but low pressure tank 60, through pipes 64 and 65. A cut out cock 76 is also provided on the high capacity side, and a pipe 77, connecting the train line with a gage 78 is also provided with a similar cut out 79.

In conjunction with this equipment there is also provided a combined storing, distributing and equalizing device 80, of the type shown in detail in Fig. 6. It is in direct communication, as through pipe 81, with the high capacity tank 60, and this pipe is provided with a cut out cock 82 and a restricted connection 83. Between the bushing and stop cock, a pipe 84 is carried around and into communication with the gage pipe 75. This pipe is provided with a cut out cock 85, and a vent cock 86 is placed in proximity to its connection with the gage pipe.

Between the vent cock 86 and cut out 85, there is a pipe 87 tapped into branch pipe 84. This pipe is carried around and communicates with a pressure reducing valve 88 on the interior of box 80, through an opening in its side, while a branch pipe 89 leads from pipe 87 into communication with a regulating valve 90 on the interior of box 80, through an opening in the bottom thereof. A cut out cock 91 is provided in pipe 87, and a pipe 92 leads from pipe 87 into communication with an auxiliary reservoir of the caboose. By closing cocks 85 and opening cock 91 pressure of the auxiliary reservoir may be tested. By closing valve 91 and opening valve 85 pressure in casing 80 may be determined.

The control valve 18 comprises an outer stationary casing to which the pipes already referred to are attached, and an inner movable member having passages A and B and an actuating handle 18'. When in the position shown in Fig. 2, all of the passages are closed. When in the position shown in Fig. 3, communication is opened between pipes 19 and 20 through passage A, and between pipes 25 and 26, through passage B. When in the position shown in Fig. 4, communication is made between pipe 32 and exhaust opening 33.

Referring to Figs. 5 and 6, which show the combined storing, equalizing and distributing instrumentalities for use in the engine and caboose respectively, each of them has in common a casing, here shown as tubular, and provided with a threaded cap in one end adapted to vary the internal dimensional capacity of the casing by threading it into or out of the casing. The form shown in Fig. 5, is for the engine equipment, and has threaded into its side two reducing and safety valves 96 and 97. Each of these valves is preferably of the type shown in section in Fig. 7, and comprises a casing 98, adapted to be threaded at its lower extremity into the bottom of the equalizing device, and having at its upper portion a cap member 99. On the interior of the casing there is the usual stem 100, valve head 101, tension spring 102, and tension regulating member 103, which is threaded into the interior of the casing. Outlet ports 104 are placed in the sides of the casing, and it is customary to regulate the tension of these valves in such a way that one is about twenty pounds in advance of the other, as will be explained more fully later.

In the caboose equipment, there is provided a valve 90 in the bottom of the casing, and shown in detail in Fig. 6. It is of well known construction, but for adjusting and operation in connection with the present system, an operating arm or member 105 is connected to a link 106 which is in direct connection with the valve stem. The arm 105 passes through an opening in the side of the casing and may be provided with a stuffing box, or other means of making an air tight connection.

Operation: One of the valves in the equalizing and storing apparatus 28 that is, valve 96, and all of the valves which are on each car and thus distributed throughout the train line, are set at normal train line pressure. The other valve in the train equipment is set generally about twenty pounds in advance of this train line pressure. In the event that there is too much pressure in the auxiliary reservoirs due to an over charged train line, valve 96 will unseat and allow this pressure to vent into the interior of the casing 95. From here it can be vented to the atmosphere through vent cock 40, or stored and returned to the main reservoir through pipe 38, in the event that through a failure of the pump the pressure in the main reservoir drops below that in the casing, or when the pressure in the main reservoir has been reduced after an application of the brakes.

By the use of the valve 18, communication may be made directly between the equalizing reservoir and the train line, and between the main reservoir and the train line to quickly build up pressure along the line, when the control valve is in the position shown in Fig. 3. With brake valve on lap position the train line can be fed through this control valve, from the feed valve, when the control valve is in the position shown in Fig. 3. In this position, valve 18 will also charge the equalizing reservoir to the same pressure as the train line, and if valve 29 is open, air pressure will also be communicated to receptacle 28 through pressure-valve 96, in the event that valve 29 is open. In these connections control valve 18 takes considerable wear from the brake valve, and reduces obstructions due to clogged ports, as this control valve may, under certain conditions be used instead of the brake valve, thus reducing the wear on the latter.

Pipe 41 and valve 42 permit the use of either the high or low pressure governors. With the brake valve on lap position, and valve 42 open, the low pressure governor will be in control of the pump. If valve 42 is closed, the high pressure governor will be in control.

The retaining valves as applied to the cars are adapted to take down a pressure in the brake cylinders of about 50 pounds to the square inch, to about 15 pounds, and retain this pressure until manually operated during releasing and recharging of train line and auxiliary reservoirs. This manual release is effected by operating a retaining valve 45'' which is connected by a pipe 45' in the triple valve in the usual manner. This valve when open will release all the air from the brake cylinder and pipe 55 during a release of the brakes, and when closed will retain the normal pressure.

It frequently happens after a service application there will be a pressure of approximately 50 pounds in the brake cylinders and the auxiliary reservoir. If on a grade, it may be necessary to reduce this pressure to approximately 15 pounds, particularly during recharging of the auxiliary reservoir, and this most frequently happens when the engineer changes the pressure in his train line from low to high. Valves 54 in the casings 50, being set at normal train line, will unseat whenever the pressure exceeds this amount, and thus always maintain a uniformity of pressure throughout the train line.

In the secondary control or caboose equipment, there is provision made for filling or exhausting the storage tanks through the use of feed and vent valve 72. The train line may be fed or relieved of pressure by opening up connection directly with the tanks through pipes 64 and 70, or by closing up the direct connections and allowing pressure for these to pass through the valves in the casing 80. Tank 60 may be connected with the atmosphere or a charging plant directly, by closing valves 67 and 69, and by opening valves 71 and 72. To feed the train line directly from tanks 60 and 61, valves 67, 69 and 72 are closed and valve 71 is opened, the course of air being through pipes 70 and 65 to the train line.

The tanks may be fed from the train line through the auxiliary reservoirs by closing valve 91, whereupon air passes through pipe 92, into casing 80, and from here, through pipe 81 to tank 60, and thence to tank 61 through pipe 62. By connecting vent 72 to a suitable source of pressure medium, and closing certain of the valves a direct connection may be made with the tanks for the purpose of charging them. The previously mentioned closing of valves is effected only when it is desired to feed the tank from the train line and notify the engineer that the caboose equipment is dropping below normal pressure. This can be determined by examination of the train line gage. In the event that accident prevents application of the brakes from the engine, they may be applied from the caboose, and the engineer can also regulate the pressure in the train line, and the storage of pressure medium in the caboose in conjunction with and independent of the secondary control. Application of the brakes is effected from the caboose by closing valves 67, 69 and 71, and opening valve 72 to the atmosphere. Service or emergency application depend upon the extent to which the valve is opened, and in making the application gage 79 may be noted to determine the amount of pressure reduction being made.

The engineer can regulate the pressure in the train line by placing brake valve 5 on lap position, operating valve 18 to the position shown in Fig. 3, and opening valve 24 to charge the train line directly from the main reservoir, or opening valve 13 and closing valve 24 to charge the train line through the feed valve. This overcharging of the train line is communicated to the storage tanks in the caboose through pipe 89, casing 80 and pipe 81, as just explained. The train line is frequently overcharged by reason of leaky feed valves.

By the use of the regulating member 105 attached to the valve in casing 80, the amount of pressure passing from the train line, through the auxiliary reservoir and pipe 89 to the casing can be regulated, and the provision of the stop and cut out cocks permits the working of the apparatus, in the ordinary manner.

While I have disclosed the invention in the embodiment herein shown and described, it will be understood that I do not wish to limit myself to the precise form of this disclosure, nor to any particular manner in which the same has been or may be applied, as many changes in the construction and arrangement of the parts may be made without departing from the spirit of the invention or sacrificing its chief advantages.

What I claim is:—

1. A pressure brake system comprising in combination a primary control station having a source of pressure medium; a circulating system therefor; a brake valve in connection therewith; a secondary control valve in connection with said brake valve; and an automatic means of regulating the pressure medium in connection with said brake valve and said control valve.

2. As an article of manufacture for use in connection with a pressure brake system, a combined storing regulating and distributing instrumentality comprising a casing provided with an inlet and outlet port; a pressure regulating valve in communication with said inlet port; a valve in connection with said outlet port; and means for increasing the interior dimensional area of the casing.

3. As an article of manufacture for use in automatically regulating the pressure in air brake systems; a casing provided with an internally arranged pressure regulating valve; and means for effecting a change in the interior dimensional capacity of the casing, including a threaded cap member coöperating with an internal thread in the casing.

4. A pressure brake system comprising in combination a primary control station having a source of pressure medium; a circulating system therefor; a brake valve in connection therewith; a secondary control valve in connection with said brake valve; and an automatic means of regulating the pressure medium in connection with said brake valve and said control valve, said means including a casing in said circulating system; and a pressure regulating instrumentality disposed within said casing and connected with said circulating system.

5. A pressure brake system comprising in combination a primary control station having a source of pressure medium; a circulating system therefor; a brake valve in connection therewith; a secondary control valve in connection with said brake valve; and an automatic means of regulating the pressure medium in connection with said brake valve and said control valve, said means including a casing in said circulating system; and a pressure regulating instrumentality disposed within said casing and connected with said circulating system; said secondary control valve being disposed in said circulating system between the primary control valve and said casing.

In testimony whereof I affix my signature in the presence of two subscribing witnesses.

MARTIN G. HIGGINS.

Witnesses:
JOHN J. BARRETT,
JAMES H. HIGGINS.